United States Patent
McCloy et al.

(10) Patent No.: US 7,140,756 B2
(45) Date of Patent: Nov. 28, 2006

(54) EXTERIOR REAR VIEW MIRROR HAVING A CHIN STRAP AND A REPEATER

(75) Inventors: Graham B. McCloy, Cundletown (AU); Ronald R. Raymo, Jr., Fort Gratiot, MI (US)

(73) Assignee: Schefenacker Vision Systems USA Inc., Marysville, MI (US)

( * ) Notice: Subject to any disclaimer, the term of this patent is extended or adjusted under 35 U.S.C. 154(b) by 113 days.

(21) Appl. No.: 10/695,121

(22) Filed: Oct. 27, 2003

(65) Prior Publication Data

US 2004/0085776 A1 May 6, 2004

Related U.S. Application Data

(63) Continuation of application No. 09/496,105, filed on Feb. 1, 2000, now Pat. No. 7,008,089.

(51) Int. Cl.
*B60Q 1/26* (2006.01)

(52) U.S. Cl. ...................... 362/494; 362/540; 362/549; 362/647; 362/135

(58) Field of Classification Search ................ 362/544, 362/495, 135, 140, 142, 234, 241, 245, 249, 362/226, 800, 545, 547, 541, 540, 464, 640, 362/548, 647
See application file for complete search history.

(56) References Cited

U.S. PATENT DOCUMENTS 4,781,436 A * 11/1988 Armbruster ................. 359/606
5,371,659 A    12/1994 Pastrick et al.
5,497,305 A     3/1996 Pastrick et al.
5,497,306 A     3/1996 Pastrick
5,669,699 A     9/1997 Pastrick et al.
5,669,704 A     9/1997 Pastrick
5,669,705 A     9/1997 Pastrick et al.
5,823,654 A    10/1998 Pastrick et al.
5,863,116 A     1/1999 Pastrick et al.
5,938,322 A *   8/1999 Alonzo et al. ............... 362/494
6,227,689 B1 *  5/2001 Miller ......................... 362/494
6,331,066 B1 * 12/2001 Desmond et al. ........... 362/494
6,511,189 B1 *  1/2003 Henion et al. ............... 359/850
6,511,192 B1 *  1/2003 Henion et al. ............... 359/864
6,582,109 B1 *  6/2003 Miller ......................... 362/494
2005/0190465 A1* 9/2005 Henion et al. ............... 359/864

FOREIGN PATENT DOCUMENTS

DE        3635471 A1    4/1988

* cited by examiner

*Primary Examiner*—Thomas M. Sember
(74) *Attorney, Agent, or Firm*—Warn, Hoffmann, Miller & LaLone, P.C.

(57) ABSTRACT

An exterior rear view mirror assembly is disclosed which incorporates a bezel formed generally beneath the mirror housing. The bezel accommodates a rearward facing light source assembly to provide a rearward facing signal. The bezel may be integrally formed with the rear view mirror assembly or may be a separate component attached to the rear view mirror assembly.

39 Claims, 4 Drawing Sheets

EXTERIOR REAR VIEW MIRROR HAVING A CHIN STRAP AND A REPEATER

CROSS-REFERENCE TO RELATED APPLICATIONS

This application is a continuation of U.S. patent application Ser. No. 09/495,105 filed on Feb. 1, 2000 now U.S. Pat. No. 7,008,089.

FIELD OF THE INVENTION

The present invention relates generally to rear view mirror assemblies for motor vehicles and, more particularly, to exterior motor vehicle mirror assemblies which incorporate auxiliary lighting provided from a bezel section formed in a lower portion of the mirror assembly.

BACKGROUND OF THE INVENTION

Auxiliary warning lights have long been incorporated on the sides of motor vehicles to provide a means of communicating the intentions of the operator thereof to adjacent vehicles, such as the intention to change traffic lanes or to make a turn. Such lights are advantageous in providing notice to an adjacent vehicle that may be located in a blind spot and positioned such that the signaling vehicle's rear section is not visible to the operator of an adjacent vehicle.

While incorporation of such auxiliary warning lights is relatively easy and straightforward on work-type vehicles, it becomes a somewhat more complex problem when passenger-type vehicles are involved due in part to the importance of aesthetic appearance. Other considerations which may apply to any type of vehicle include the need to position the lights so as to minimize any impact on the vision of the vehicle operator and to maximize the area to the side and rear of the vehicle from which the auxiliary lighting is visible. Additionally, because in many cases the vehicle manufacturer may want to offer the auxiliary lighting arrangement as an option on certain vehicles, it is highly desirable that the lighting system be designed to easily and conveniently integrate with the existing vehicle design so as to minimize added labor and/or costs associated with its installation.

SUMMARY OF THE INVENTION

This invention is directed to an exterior rear view mirror assembly including a housing adapted to be secured to an outer surface of a motor vehicle, the housing having a generally rearwardly facing opening. A reflective mirror is disposed within the opening, and a bezel forms a lower portion of the housing. The bezel has an opening for projecting light, and a light transmitting lens is disposed in the bezel. A light source assembly having a light source is placed within the bezel. The light source assembly generates light to provide a light signal from the light transmitting lens.

These and other advantages and features of the present invention will become readily apparent from the following detailed description, claims and drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
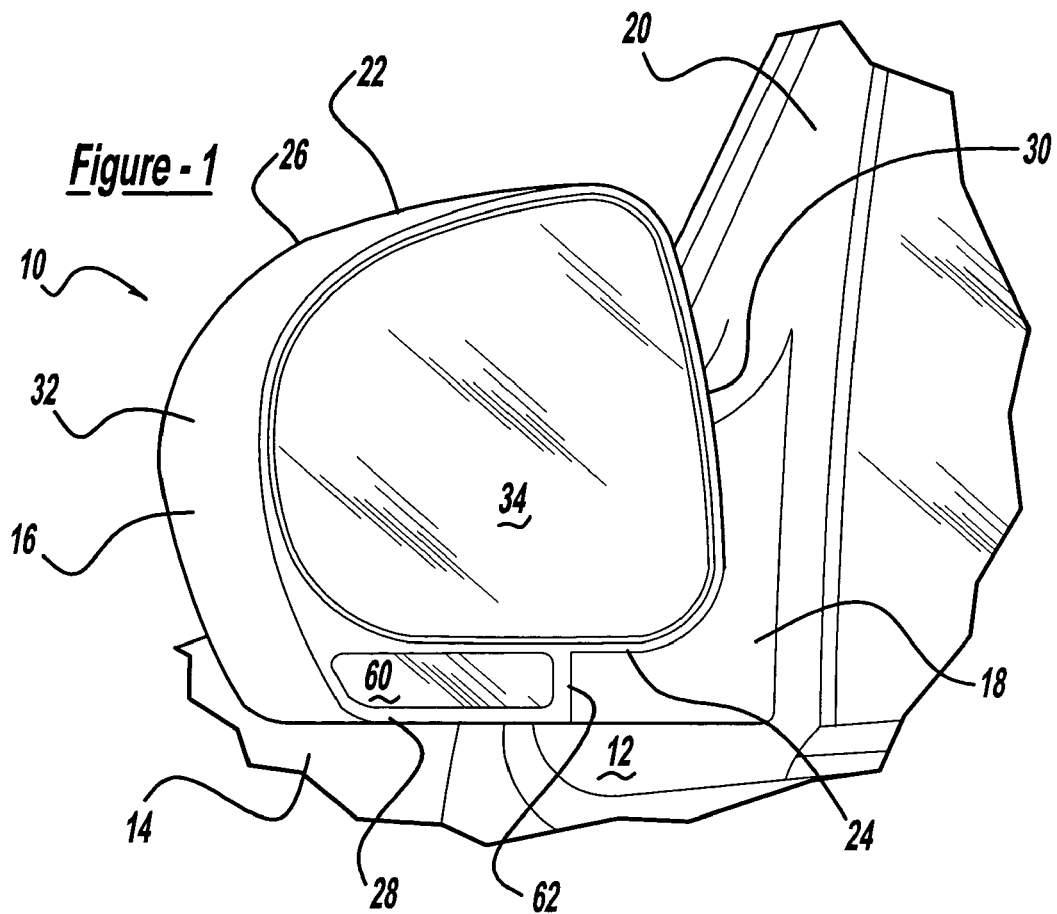
FIG. 1 is a fragmentary perspective view of a side of a motor vehicle having an exterior rear view mirror assembly incorporating an auxiliary warning light provided thereon all in accordance with the present invention.

The following description of the preferred embodiment(s) is merely exemplary in nature and is in no way intended to limit the invention, its application, or uses.

Referring now to the drawings and in particular to FIGS. 1–4, there is shown an exterior rear view mirror assembly indicated generally at 10 installed on the door 12 of a motor vehicle 14. Mirror assembly 10 is of the typical breakaway design and includes a housing 16 pivotally supported on an arm 18 extending outwardly from a generally triangularly shaped mounting plate or sail 20. Preferably two mirror assemblies 10 will be mounted on a vehicle 14, one on each side thereof.

Figure 3:
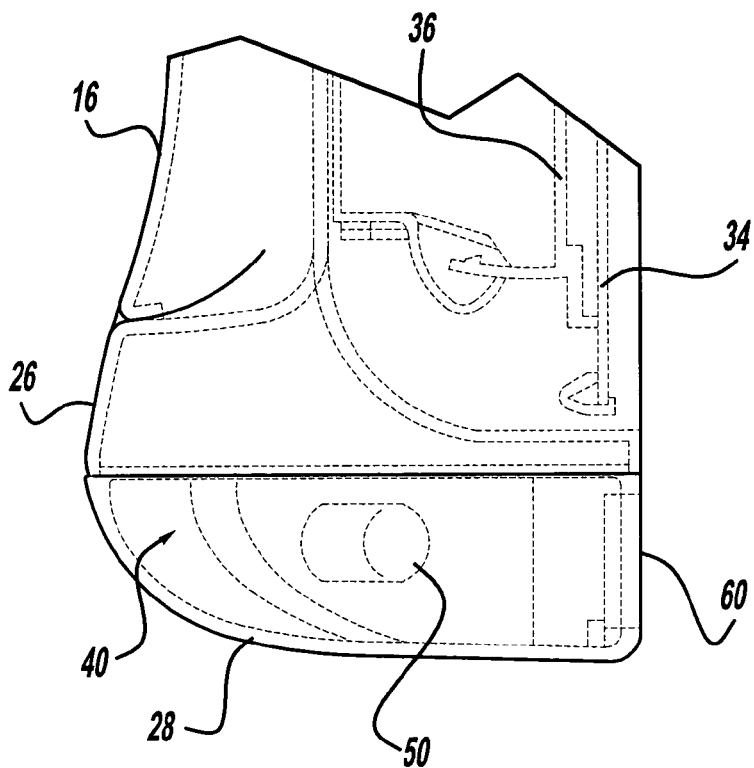
FIG. 3 is a vertical cross-sectional view of the mirror assembly of FIG. 2.

Housing 16 may be of any desired shape and includes an upper wall portion 22, a lower wall portion 24, a forwardly facing wall portion 26, a bezel section 28, and inner and outer wall portions 30 and 32, all of which merge smoothly together so as to present a pleasing appearance. The rearwardly facing portion of housing 16 is open and is adapted to receive a reflective element or mirror 34. Mirror 34 may be formed of glass or plastic and may be either of any suitable type such as flat, concave, convex, or of the type which automatically adjusts to reduce glare. A suitably shaped support member or backing 36, shown in FIG. 3, is secured within the housing 16 and serves to movably support mirror 34 within the opening. The support member 36 may include a suitable drive motor or motors 38 and the like for remote control adjustment of mirror 34 as well as means for heating the mirror if desired.

Figure 2:
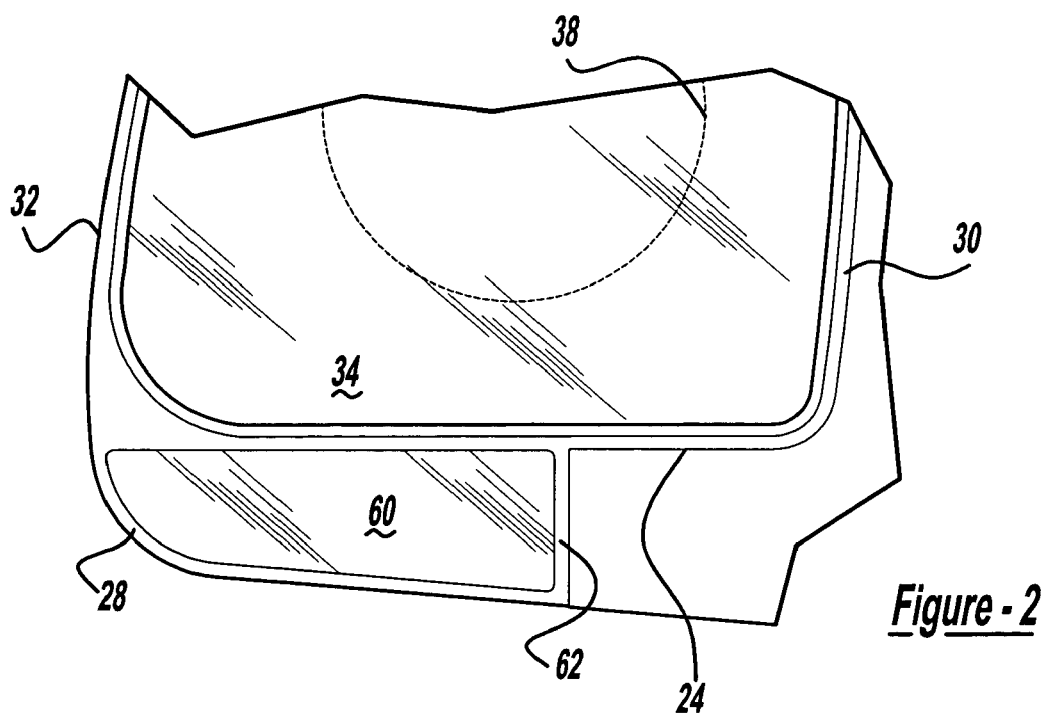
FIG. 2 is a front view of a first embodiment of the mirror assembly of FIG. 1 showing the bezel formed integrally with the mirror housing.
Figure 4:
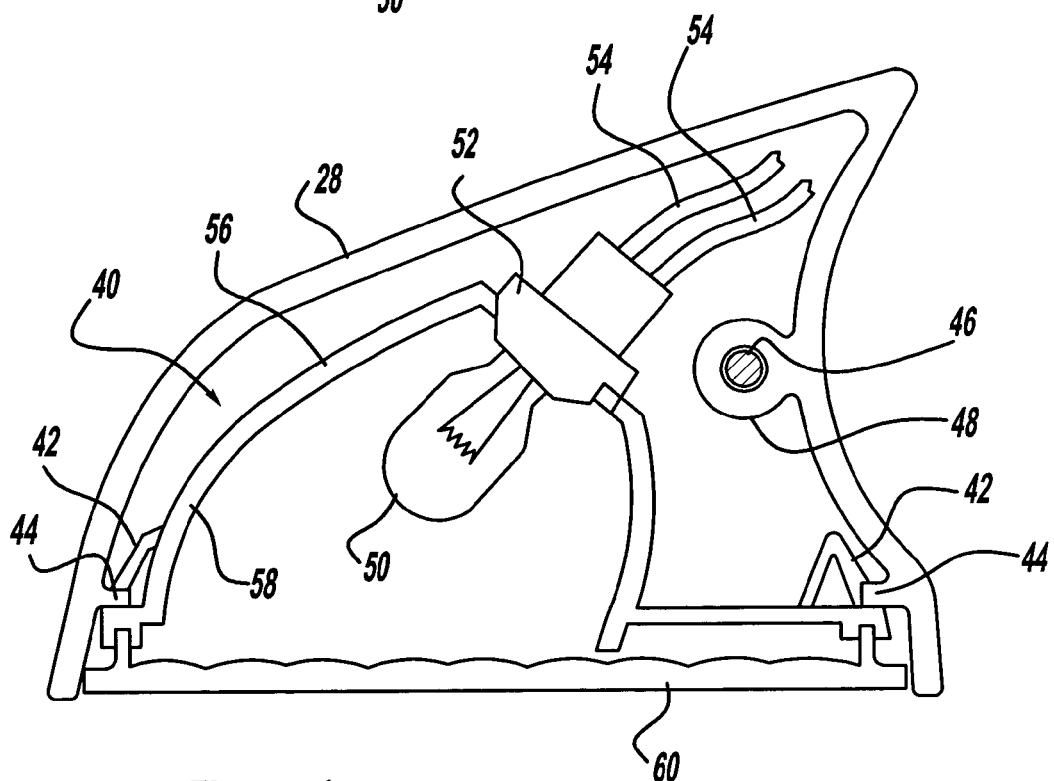
FIG. 4 is a horizontal cross-sectional view of the mirror assembly of FIG. 2.

As best seen in FIGS. 2–4, rear view mirror assembly 10 will be described as an integral unit in which housing 16 incorporates bezel 28 to form a unitary construction. Bezel 28 houses a light source assembly 40 which is inserted within bezel 28, as best seen in FIG. 4. Light source assembly 40 attaches to bezel 28 and is maintained within bezel 28 by clips 42 which engage tabs 44 formed in bezel 28. Alternatively, a threaded fastener 46 may be inserted up through the bottom of bezel 28 through boss 48 and into a corresponding boss in housing 16.

Light source assembly 40 includes a light source 50, such as a light bulb which engages a connector 52. A pair of electrical leads 54 provide electrical power to light source 50 through connector 52. Connector 52 engages a metallized housing 56. The inner wall 58 of metallized housing 56 is preferably coated with a reflective material and shaped to direct a maximum amount of light from the light source 50 to a lens 60. The reflective coating may be colored using one of a red, amber, or white reflective coating. Lens 60 is preferably vibration welded to metallized housing 56 and is designed so as to direct light emitted from light source 50 outwardly from bezel 28 through an arc sweeping an angle 30 degrees rearward from a transverse line through 70 degrees from the transverse line. As best shown in FIGS. 1 and 2, bezel 28 extends from outer wall portion 30 of mirror assembly 10 inboard to a descending wall 62 which defines an inboard side of bezel 28. Because bezel 28 only covers a portion of the transverse section or surface of housing 16, bezel 28 does not interfere with the breakaway feature of rear view mirror assembly 10.

Figure 5:
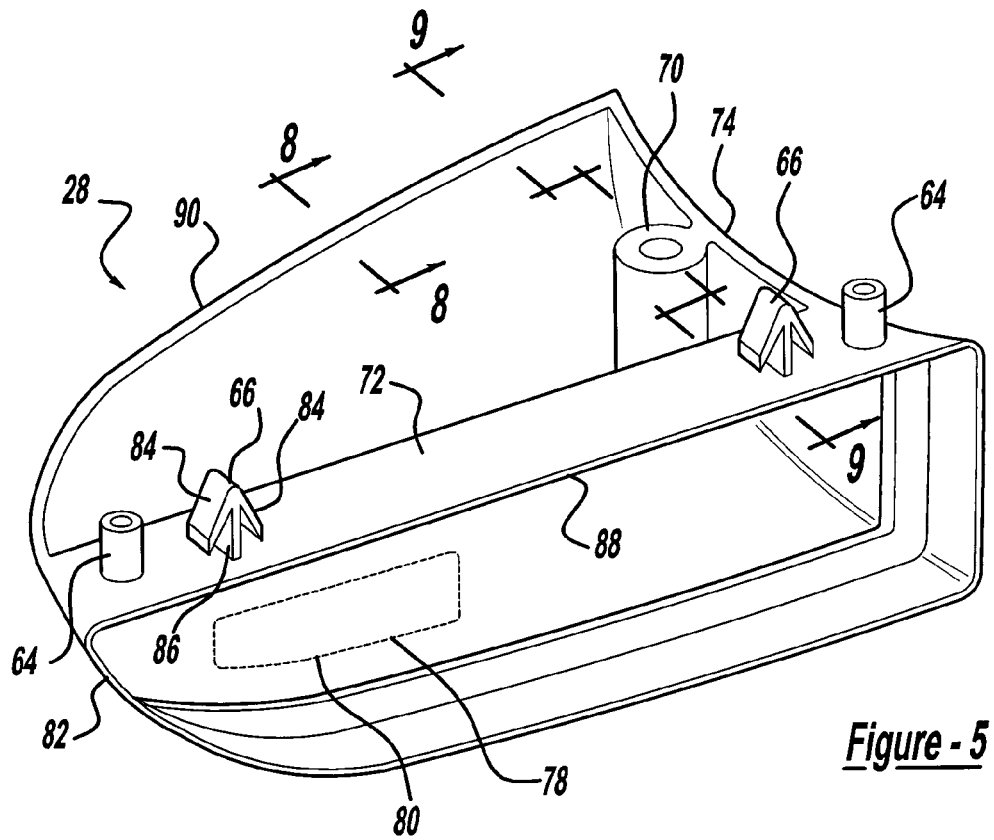
FIG. 5 is a perspective view of a second embodiment of the mirror assembly of FIG. 1 showing the bezel formed as discreet components attached to the mirror housing.
Figure 6:
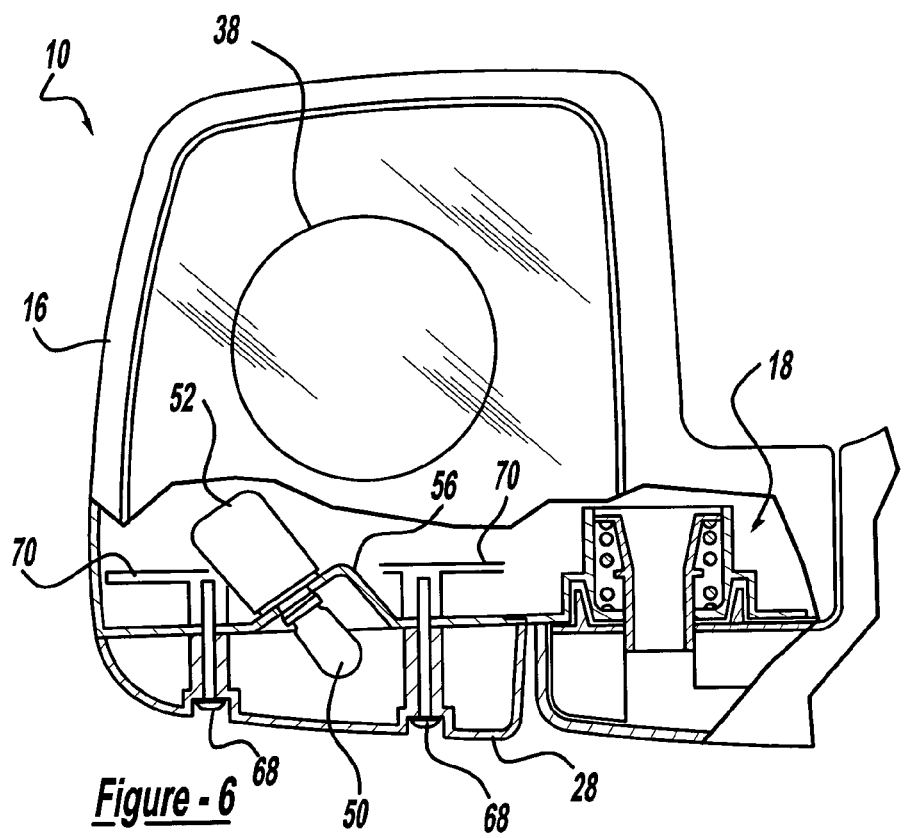
FIG. 6 is a partial cross-sectional view of the mirror housing and separate bezel component attached to the mirror housing, the section being taken along a transverse axis of the mirror assembly.

In addition to the integral bezel and housing assembly shown in FIGS. 2–4, bezel 28 may be embodied as a separate component which is then secured to housing 16, as will be described with respect to FIGS. 5–9. Like reference numerals from FIGS. 1–4 will be used to refer to similar components throughout FIGS. 5–9. FIG. 5 depicts a perspective view of bezel 28 shown when detached from housing 16. Bezel 28 is preferably contoured to provide a smooth overall appearance when interconnected with housing 16 to form rear view mirror assembly 10. However, such contour need not necessarily be smooth and may be broken or otherwise configured to meet various design criteria.

Bezel 28 interconnects to housing 16 and aligns using a pair of locators 64 formed on a longitudinal member 72. Longitudinal member 72 runs longitudinally between a rear surface 74 and a front surface 88. Longitudinal member 72 may also define an edge 84 for bezel 28. Locators 64 are generally defined as cylindrical members which project upwardly from longitudinal member 72. Locators 64 engage corresponding locating holes or apertures in housing 16 to provide positive location for bezel 28 with respect to housing 16. Bezel 28 also includes a pair of living or tree clips 66 which project upwardly from longitudinal member 72. Living clips 66 generally include a central portion 86 which projects generally vertically from longitudinal member 72. A pair of opposing flexible, opposing members 84 descend diagonally away from a top portion of central member 86. Opposing members 84 may be compressed towards central number 86 to enable insertion through an aperture. Once inserted in the aperture, opposing members 84 expand so that living clip 66 cannot be removed from the aperture without an operator displacing the opposing members toward each other. One skilled in the art will recognize that longitudinal member 72 defines one configuration for supporting locator 64 and living clips 66. Alternative configurations may include transverse members, or a plurality of longitudinal members 72.

Figure 7:
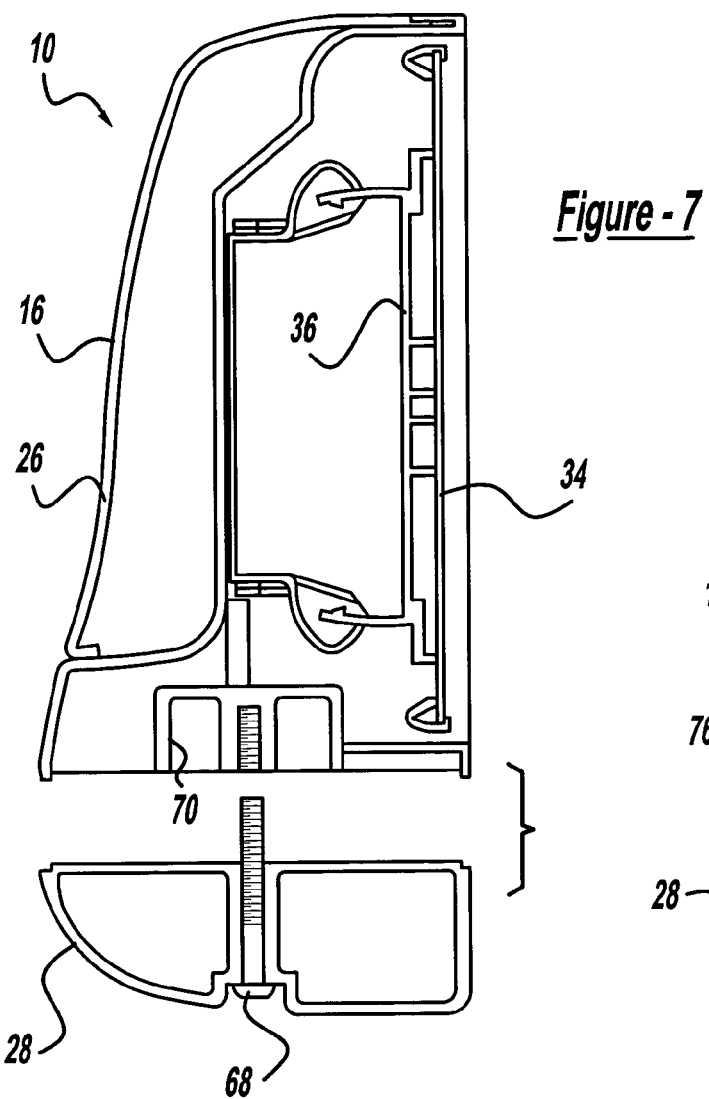
FIG. 7 is a vertical cross-sectional view of the mirror housing and separate bezel component attached to the mirror housing.

Alternatively, as shown in FIG. 7, threaded fastener 68 may be used independently or in combination with clips 66 to interconnect bezel 28 to a boss 70 formed in housing 16. In either configuration, a light source assembly 40, as described with respect to FIGS. 2–4, mounts within bezel 28 and may be generally configured as described above. Metallized housing 56 may be mounted to bezel 28 via threaded fastener 68 which engages a boss 70 formed in a bottom surface of bezel 28.

In addition to rear surface 74 and front surface 82, bezel 28 includes a side surface 90 which may be recessed from edge 88 or generally form a smooth contour with edge 88. Side surface 90 is preferably selected to provide a pleasing decorative appearance of bezel 28 and preferably is formed to accommodate light source assembly 40 in combination to provide a pleasing decorative appearance.

Figure 8:
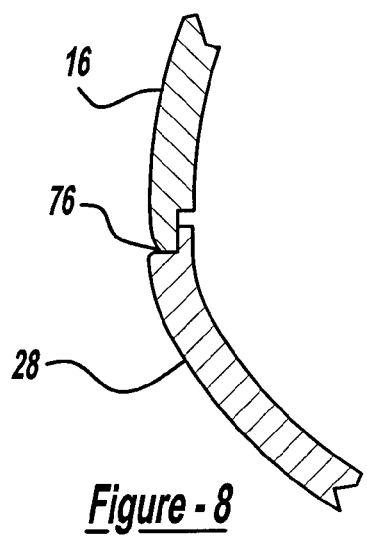
FIG. 8 is an expanded view taken along the line 8—8 of FIG. 5.
Figure 9:
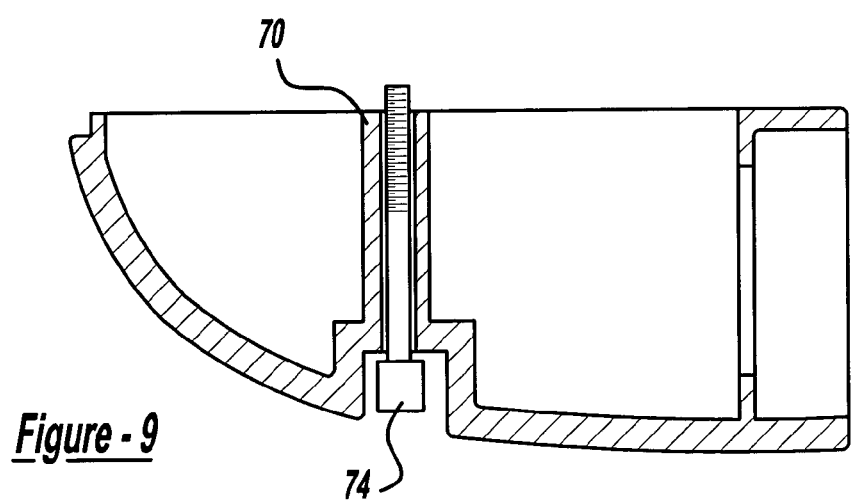
FIG. 9 is an expanded view taken along the line 9—9 of FIG. 5.

In the embodiment in FIGS. 5–9, because bezel 28 is a separate component which is attached to housing 16 to assemble into rear view mirror assembly 10, a preferably smooth interconnection between housing 16 and bezel 28 should be provided in order to minimize wind noise caused by the joint connection between bezel 28 and housing 16. FIG. 8 depicts a cross-sectional view of the interconnection between housing 16 and bezel 28. Housing 16 overlaps bezel 28 to form a joint 76 which minimizes wind noise.

Several features of rear view mirror assembly 10 are applicable to either embodiment described herein. In particular, bezel 28 is preferably configured to accommodate a repeater for a turn signal lamp. When the vehicle operator activates a turn signal, the respective left and right mirror assemblies 10 output a light signal coincident with the other vehicle turn signals. For such a configuration, the light output from lens 60 preferably is either red or amber. As an alternative to a turn signal, bezel 28 may operate in accordance with a side marker light. As a side marker, when the vehicle lights are turned on, bezel 28 preferably operates a red light to mark the sides of the vehicles. Further yet, bezel 28 can provide an approach light function to direct light generally rearwardly or downwardly with respect to rear view mirror assembly 10. As an approach light, bezel 28 preferably outputs a white light, and lens 60 is preferably smoky white. As will be understood by one skilled in the art, however, the color of the light output by bezel 28 will vary in accordance with the requirements of any safety specifications and customer requirements, and may be varied accordingly. Further, various combinations of lens colors may be used to achieve a desired color output by metallized housing 56.

Further yet, in addition to a rearward facing light as described above, an additional or alternate light output may be achieved by forming an opening 78, as best seen in FIG. 5, in bezel 28 and inserting a lens 80 therein. A similarly configured metallized housing 56 may be adapted for installation in side surface 90 of bezel 28 to provide a preferred alternate or additional light output from bezel 28. The light output from lens 80 may provide a side marker, side turn signal, reverse light, or approach light function as described above.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

What is claimed is:

1. An exterior rear view mirror assembly comprising:
   a housing having an upper wall portion, a lower wall portion, a forwardly facing wall portion, an inner wall portion, and an outer wall portion, adapted to be secured to an outer surface of a motor vehicle and having a generally rearwardly facing opening;
   a reflective mirror disposed within the opening;
   a modular bezel connected to said lower wall portion of said housing, the modular bezel having a front surface and a rear surface, an opening for projecting light and a holder positioned in said modular bezel wherein said modular bezel is positioned entirely below said reflective element, said modular bezel being a separate structure from said housing;

a longitudinal member formed on said bezel and extending between said front surface and said rear surface, wherein said longitudinal member has a surface positioned adjacent said lower wall of said housing when said bezel is connected to said housing;

one or more locators extending upward from said surface of said longitudinal member, said one or more locators aligns with one or more locators on said lower wall of said housing;

a light transmitting lens formed in the modular bezel; and a light source assembly located and connected to said holder inside the modular bezel having a light source connectable to the light source assembly wherein the light source generates light, the light source assembly generating light projected through the opening in the modular bezel, the light source assembly being operable to provide a light signal visible through the light transmitting lens.

2. The exterior rear view mirror assembly as set forth in claim 1 wherein the opening in the modular bezel projects rearwardly.

3. The exterior rear view mirror assembly as set forth in claim 2 wherein the light source assembly is removably secured to the modular bezel.

4. The exterior rear view mirror assembly as set forth in claim 1 wherein the light source generates light to provide at least one of a turn signal light, a vehicle approach light, and a vehicle side marker light.

5. The exterior rear view mirror assembly as set forth in claim 1 wherein the light source generates light to provide a vehicle approach light and wherein the lens is one of red, amber, and white.

6. The exterior rear view mirror assembly as set forth in claim 1 wherein the light source generates light to provide a vehicle side marker light and wherein the lens is one of red, amber, and white.

7. The exterior rear view mirror assembly as set forth in claim 1 wherein the light source generates light to provide a turn signal and wherein the lens is one of red, white, and amber.

8. An exterior rear view mirror assembly as set forth in claim 1 wherein the light source assembly has a reflective inner surface, the inner surface being shaped to direct a maximum amount of light emitted from the light source to the lens.

9. An exterior rear view mirror assembly as set forth in claim 1 wherein the modular bezel is integrally formed with the housing.

10. An exterior rear view mirror assembly as set forth in claim 1 wherein the modular bezel is separately formed from the housing, and wherein a fastener attaches the modular bezel to the housing.

11. An exterior rear view mirror assembly as set forth in claim 1 wherein the lens is operative to direct light through an arc extending at least 40 degrees rearwardly from approximately a line passing through the mirror assembly and extending perpendicularly to the longitudinal axis of the vehicle.

12. An exterior rear view mirror assembly as set forth in claim 1 wherein the light source assembly includes an electrical connector for supporting the light source.

13. An exterior rear view mirror assembly as set forth in claim 12 wherein the bulb holder is integrally formed with the light source assembly.

14. An exterior rear view mirror assembly as set forth in claim 1 wherein the light source assembly is operable to provide a signal visible through the light transmitting lens to a rearward motor vehicle when actuated.

15. The mirror assembly of claim 1 further comprising one or more clip fasteners projecting upwardly from said surface of said longitudinal member for engagement with one or more apertures on said wall of said housing.

16. A mirror assembly for a vehicle comprising:

a mirror housing having an upper wall portion, a lower wall portion, a forwardly facing wall portion, an inner wall portion and an outer wall portion;

a reflective element;

a backing assembly supported by the mirror housing, the backing assembly supporting the reflective element;

a modular bezel having a front surface and a rear surface, formed separately from the mirror housing and connected to said lower wall portion, wherein said modular bezel is positioned entirely below said reflective element, the modular bezel having an opening for projecting light and a holder positioned in the modular bezel;

a longitudinal member formed on said bezel and extending between said front surface and said rear surface, wherein said longitudinal member has a surface positioned adjacent said lower wall of said housing when said bezel is connected to said housing;

one or more locators extending upward from said surface of said longitudinal member, said one or more locators aligns with one or more locators on said lower wall of said housing;

a light module connectedly disposed within the holder of said modular bezel, the light module having a light source, wherein light from the light source projects through the opening; and a lens formed in the opening, the light projecting through the lens.

17. The mirror assembly of claim 16 wherein the opening in the bezel projects rearwardly.

18. The mirror assembly of claim 16 wherein the light source generates light to provide at least one of a turn signal light, an approach light, and a vehicle side marker light.

19. The mirror assembly of claim 16 wherein the light source assembly has a reflective inner surface, the inner surface being shaped to direct a maximum amount of light emitted from the light source to the lens.

20. The mirror assembly of claim 16 wherein the lens is operative to direct light through an arc extending at least 40 degrees rearwardly from approximately a line passing through the mirror assembly and extending perpendicular to the longitudinal axis of the vehicle.

21. The mirror assembly of claim 16 wherein the light source is operable to provide a signal visible through the light transmitting lens to a rearward motor vehicle when actuated.

22. The mirror assembly of claim 16 further comprising a fastener for attaching the light module to the modular bezel.

23. The mirror assembly of claim 16 further comprising a clip-type fastener for connecting said modular bezel to said lower wall portion of said mirror housing.

24. The mirror assembly of claim 16 further comprising one or more clip fasteners projecting upwardly from said surface of said longitudinal member for engagement with one or more apertures on said wall of said housing.

25. A mirror assembly for a vehicle comprising:
a mirror housing having an upper wall portion, a lower wall portion, a forwardly facing wall portion, an inner wall portion and an outer wall portion;
a reflective element;
a backing assembly supported by the mirror housing, the backing assembly supporting the reflective element;
a modular bezel formed as a separate element and attached to said lower wall portion, a front surface and a rear surface, wherein said modular bezel is positioned entirely below said reflective element, the modular bezel having an opening for projecting light through the opening, and a holder positioned in the modular bezel;
a longitudinal member formed on said bezel and extending between said front surface and said rear surface, wherein said longitudinal member has a surface positioned adjacent said lower wall of said housing when said bezel is connected to said housing;
one or more locators extending upward from said surface of said longitudinal member, said one or more locators aligns with one or more locators on said lower wall of said housing;
a light module disposed within the holder inside the modular bezel, the light module having a light source for providing light projected through the opening; and
a lens formed in the opening, the light projecting through the lens.

26. The mirror assembly of claim 25 wherein the opening in the modular bezel projects rearwardly.

27. The mirror assembly of claim 25 wherein the light source generates light to provide at least one of a turn signal light, an approach light, and a vehicle side marker light.

28. An exterior rear view mirror assembly as set forth in claim 25 wherein the light source assembly has a reflective inner surface, the inner surface being shaped to direct a maximum amount of light emitted from the light source to the lens.

29. The mirror assembly of claim 25 wherein the lens is operative to direct light through an arc extending at least 40 degrees rearwardly from approximately a line passing through the mirror assembly and extending perpendicular to the longitudinal axis of the vehicle.

30. The mirror assembly of claim 25 wherein the light source is operable to provide a signal visible through the light transmitting lens to a rearward motor vehicle when actuated.

31. The mirror assembly of claim 25 further comprising a fastener for attaching the light module to the modular bezel.

32. The mirror assembly of claim 25 further comprising one or more clip fasteners projecting upwardly from said surface of said longitudinal member for engagement with one or more apertures on said lower wall of said housing.

33. An exterior rear view mirror assembly comprising:
a housing having an upper wall portion, a lower wall portion, a forwardly facing wall portion, an inner wall and an outer wall portion, adapted to be secured to an outer surface of a motor vehicle and having a generally rearwardly facing opening;
a reflective mirror disposed within the opening;
a modular bezel connected to said lower wall portion and the body of which extends in proximity to said lower wall portion, a front surface and a ear surface, the modular bezel having a rearward opening for projecting light and a holder positioned inside the modular bezel, wherein the modular bezel is positioned entirely below the reflective element;
a longitudinal member formed on said bezel and extending between said front surface and said rear surface, wherein said longitudinal member has a surfaced position adjacent said lower wall of said housing when said bezel is connected to said housing;
one or more locators extending upward from said surface of said longitudinal member, said one or more locators aligns with one or more locators on said lower wall of said housing;
a light transmitting lens formed in the modular bezel; and
a light source assembly removably secured to the holder inside of the modular bezel and having a light source, the light source assembly generating light projected through the opening in the modular bezel, the light source assembly being operable to provide a light signal visible through the light transmitting lens.

34. The exterior rear view mirror assembly as set forth in claim 33 wherein the light source generates light to provide at least one of a turn signal light, an approach light, and a vehicle side marker light.

35. The exterior rear view mirror assembly as set forth in claim 34 wherein the lens is one of red, amber, and white.

36. An exterior rear view mirror assembly as set forth in claim 35 wherein the modular bezel is integrally formed with the housing.

37. An exterior rear view mirror assembly as set forth in claim 35 wherein the modular bezel is separately formed from the housing, and wherein fasteners attach the modular bezel to the housing.

38. An exterior rear view mirror assembly as set forth in claim 35 wherein the light source assembly is operable to provide a signal visible through the light transmitting lens to a rearward motor vehicle when actuated.

39. The exterior rear view mirror assembly of claim 33 further comprising one or more clip fasteners projecting upwardly from said surface of said longitudinal member for engagement with one or more apertures on said wall of said housing.

* * * * *